United States Patent
Moser et al.

(10) Patent No.: US 12,264,739 B2
(45) Date of Patent: Apr. 1, 2025

(54) METHOD AND CONTROL APPARATUS FOR OPERATING A POSITIVE SHIFT ELEMENT OF A TRANSMISSION OF A VEHICLE, TRANSMISSION AND VEHICLE

(71) Applicant: ZF Friedrichshafen AG, Friedrichshafen (DE)

(72) Inventors: Wilhelm Moser, Oberteuringen (DE); Alain Tierry Chamaken Kamde, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/512,674

(22) Filed: Nov. 17, 2023

(65) Prior Publication Data
US 2024/0167563 A1    May 23, 2024

(30) Foreign Application Priority Data
Nov. 18, 2022    (DE) .................. 10 2022 212 304.2

(51) Int. Cl.
*F16H 61/04*    (2006.01)
*B60L 15/20*    (2006.01)
(Continued)

(52) U.S. Cl.
CPC .............. *F16H 61/04* (2013.01); *B60L 15/20* (2013.01); *F16H 59/68* (2013.01); *F16H 63/04* (2013.01);
(Continued)

(58) Field of Classification Search
CPC .......... F16H 61/04; F16H 59/68; F16H 63/04; F16H 63/304; F16H 63/502; F16H 2059/6807; F16H 2061/047; B60L 15/20
See application file for complete search history.

(56) References Cited

U.S. PATENT DOCUMENTS 5,199,311 A * 4/1993 Muyskens ............. F16H 61/705
74/335
5,899,829 A * 5/1999 Salecker ............... B60W 30/18
477/906
(Continued)

FOREIGN PATENT DOCUMENTS

DE        197 23 393 A1   12/1997
DE   102005057803 A1 *    6/2007   ............. F16H 63/50
(Continued)

OTHER PUBLICATIONS

German Patent Office, Office Action issued in German patent application No. 10 2022 212 304.2 (Jul. 19, 2023).
(Continued)

*Primary Examiner* — Sherry L Estremsky
(74) *Attorney, Agent, or Firm* — Finch & Maloney PLLC

(57) ABSTRACT

Disclosed is a method for operating an interlocking shifting element of a transmission of a vehicle, the interlocking shifting element having shifting element halves which can be moved relative to one another when opening and closing the interlocking shifting element. An electric actuator is arranged to about the relative movement between the shifting element halves when the interlocking shifting element is opened and/or closed. After recognizing a tooth-on-tooth position in the interlocking shifting element, a target torque to be applied at the transmission input is determined as a function of an electric current strength through the electric actuator of the interlocking shifting element, where the target torque is sufficient to resolve the tooth-on-tooth position in the interlocking shifting element.

9 Claims, 1 Drawing Sheet

(51) Int. Cl.
*F16H 59/68* (2006.01)
*F16H 63/04* (2006.01)
*F16H 63/30* (2006.01)
*F16H 63/50* (2006.01)

(52) U.S. Cl.
CPC ......... *F16H 63/304* (2013.01); *F16H 63/502* (2013.01); *F16H 2059/6807* (2013.01); *F16H 2061/047* (2013.01)

(56) References Cited

U.S. PATENT DOCUMENTS

| | | |
|---|---|---|
| 6,785,599 B2 | 8/2004 | Berger et al. |
| 8,406,974 B2 * | 3/2013 | Holland .............. F16H 61/2807 701/68 |
| 8,647,237 B2 | 2/2014 | Prix et al. |
| 8,827,867 B1 * | 9/2014 | Simonini ................ F16H 3/126 477/20 |
| 9,849,885 B2 * | 12/2017 | Sakamoto ............... F16D 48/06 |
| 10,259,320 B1 | 4/2019 | Reich et al. |
| 10,272,765 B1 | 4/2019 | Cho et al. |
| 2004/0195071 A1 | 10/2004 | Khaykin et al. |
| 2019/0072168 A1 | 3/2019 | Yamamura |
| 2019/0178361 A1 | 6/2019 | Cho et al. |
| 2020/0331336 A1 | 10/2020 | Kaltenbach et al. |
| 2021/0260995 A1 | 8/2021 | Akiyama et al. |
| 2021/0372506 A1 | 12/2021 | McGrew, Jr. et al. |

FOREIGN PATENT DOCUMENTS

| | | | |
|---|---|---|---|
| DE | 102010018404 A1 * | 10/2011 | ......... F16H 61/2807 |
| DE | 10 2010 039 445 A1 | 2/2012 | |
| DE | 10 2017 222 436 A1 | 6/2019 | |
| DE | 10 2019 219 957 B3 | 5/2021 | |

OTHER PUBLICATIONS

German Patent Office, Office Action issued in German patent application No. 10 2022 212 307.7 (Jul. 17, 2023).
United States Patent Office, Notice of Allowance issued in U.S. Appl. No. 18/512,699 (Jul. 30, 2024).

* cited by examiner

METHOD AND CONTROL APPARATUS FOR OPERATING A POSITIVE SHIFT ELEMENT OF A TRANSMISSION OF A VEHICLE, TRANSMISSION AND VEHICLE

RELATED APPLICATIONS

This application claims the benefit of and right of priority under 35 U.S.C. § 119 to German Patent Application no. 10 2022 212 304.2, filed on 18 Nov. 2022, the contents of which are incorporated herein by reference in its entirety.

FIELD OF THE DISCLOSURE

The invention relates to a method for operating an interlocking shifting element of a vehicle transmission. The invention further relates to a control unit for operating an interlocking shifting element of a vehicle transmission, a transmission with such a control unit, and a vehicle with such a transmission.

BACKGROUND

A drivetrain of a vehicle comprises, besides a drive unit, a transmission connected between the drive unit and a drive output. The transmission transforms rotation speeds and torques and transmits the traction force generated by the drive unit to the drive output.

In a hybrid vehicle the drive unit comprises an internal combustion engine and an electric machine. In a fully electric vehicle, also referred to simply as an electric vehicle, the drive unit comprises exclusively at least one electric machine.

The transmission of a vehicle comprises shifting elements. In each frictional gear of the transmission a first number of shifting elements are closed and a second number of shifting elements are open. To carry out a gearshift from a current gear to a target gear, at least one shifting element which is closed in the current gear, is opened and at least one shifting element which is open in the current gear, is closed.

The shifting elements of a transmission can be in the form of frictional shifting elements such as clutches or brakes, and in the form of interlocking shifting elements such as claws. When closing an interlocking shifting element such as a claw, a tooth-on-tooth position can occur in the interlocking shifting element and this can prevent the shifting element from closing completely and thus properly.

To enable the correct operation of a transmission with an interlocking shifting element it is necessary, if there is a tooth-on-tooth position in an interlocking shifting element, for that tooth-on-tooth position also to be properly resolved.

DE 10 2017 222 436 A1 discloses a method for operating a drivetrain of a motor vehicle that has a transmission comprising an interlocking shifting element, wherein, if a tooth-on-tooth is recognized in an interlocking shifting element, at least one actuator is activated in order to resolve the tooth-on-tooth position.

SUMMARY

There is a need for a method for operating an interlocking shifting element of a transmission of a vehicle and for a control unit for operating an interlocking shifting element of a transmission of a vehicle, which method enables a tooth-on-tooth position in an interlocking shifting element to be resolved in a simple and reliable manner.

Starting from there, the purpose of the present invention is to provide a new type of method and control unit for operating an interlocking shifting element of a transmission of a vehicle, a transmission with such a control unit, and a vehicle with such a transmission.

This objective is achieved by a method as disclosed herein. According to the invention, if a tooth-on-tooth position of the interlocking shifting element is recognized, then depending on an electric current strength through the element actuator of the interlocking shifting element, a target torque required at a transmission input of the transmission in order to resolve the tooth-on-tooth position of the interlocking shifting element is determined.

The strength of the electric current in the electric actuator corresponds to the strength of the electric current flowing through the electric actuator. The electric current strength can be measured or, in particular, calculated from a measured electrical voltage.

The method according to the invention enables a tooth-on-tooth position in an interlocking shifting element of a transmission to be resolved in a simple and reliable manner. For this, for the first time it is proposed that as a function of the electric current strength through the electric actuator that serves to actuate the interlocking shifting element, a target torque is determined which is required at the transmission input of the transmission in order to resolve the tooth-on-tooth position in the interlocking shifting element. In that way, without the need for a frictional shifting element, a tooth-on-tooth position in an interlocking shifting element can be resolved reliably, precisely, and without any risk that a torque applied at the transmission input might be too large and thereby perhaps damage the transmission.

Preferably, a drive unit of the vehicle, in particular an electric machine thereof, is actuated in order to deliver the target torque determined for the resolution of the tooth-on-tooth position in the interlocking shifting element. This is particularly preferred for resolving the tooth-on-tooth position in the interlocking shifting element.

Preferably, the target torque required for resolving the tooth-on-tooth position in the interlocking shifting element is determined as follows:

$$M_{SOLL} = \frac{K_M * I_A}{r_S} * \mu_Z * r_Z + M_0$$

in which $M_{SOLL}$ is the target torque, $I_A$ is the electric current strength of the electric actuator, $K_M$ is a proportionality constant, $r_S$ is a radius of a spindle of the electric actuator, $\mu_Z$ is a coefficient of friction of the transmission valid for the interlocking shifting element, $r_Z$ is a friction radius of the transmission valid for the interlocking shifting element, and $M_0$ is a torque to be transmitted by the interlocking shifting element. As a function of the electric current strength through the electric actuator this enables a particularly advantageous determination of the target torque required at the transmission input in order to resolve the tooth-on-tooth position of the interlocking shifting element in a simple and reliable manner.

Preferably the tooth-on-tooth position in the interlocking shifting element is determined as a function of the electric current strength in the electric actuator. If it is recognized, before the lapse of a defined time interval since the beginning of the activation of the interlocking shifting element by the electric actuator, that the actual current strength through the electric actuator is larger than a limit value, then the shifting position of the interlocking shifting element is recognized as a tooth-on-tooth position. If the tooth-on-tooth position of the interlocking shifting element has thus been determined as a function of the electric current strength through the electric actuator, there is no need for a position sensor to identify a tooth-on-tooth position.

The present disclosure also relates to a control unit, a transmission, and a vehicle.

BRIEF DESCRIPTION OF THE DRAWINGS

Preferred further developments will be apparent in light of the disclosure, including the figures. Example embodiments of the invention, to which it is not limited, are explained in greater detail with reference to the drawing, which shows.

DETAILED DESCRIPTION

Figure 1:
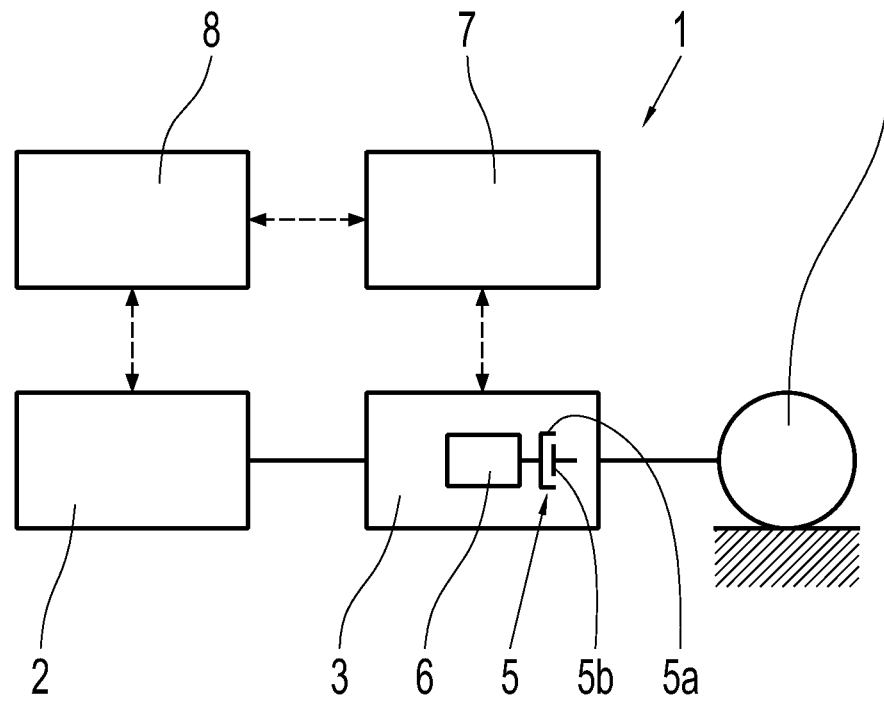
FIG. 1: A block diagram of a drivetrain scheme of a vehicle in the form of an electric vehicle.

FIG. 1 shows, very schematically, a drivetrain 1 of an electric vehicle. The drivetrain 1 comprises an electric machine 2 and a transmission 3 connected between the electric machine 2 and a drive output 4.

The transmission 3 transforms rotation speeds and torques and transmits the traction force generated by the electric machine 2 to the drive output 4.

The transmission 3 comprises as a shifting element an interlocking shifting element 5. Of the interlocking shifting element 5, two shifting element halves 5a, 5b are shown, which are moved relative to one another when the interlocking shifting element 5 is opened and closed. This relative movement between the shifting element halves 5a, 5b of the interlocking shifting element 5 when the interlocking shifting element 5 is opened and/or closed, is brought about by an electric actuator 6.

FIG. 1 also shows a transmission control unit 7 and a motor control unit 8.

The transmission control unit 7 controls and/or regulates the operation of the transmission 3, and for that purpose exchanges data with the transmission 3. The motor control unit 8 controls and/or regulates the operation of the electric machine 2 and for that purpose exchanges data with the electric machine 2. Furthermore, the motor control unit 8 and the transmission control unit 7 exchange data with one another.

Figure 2:
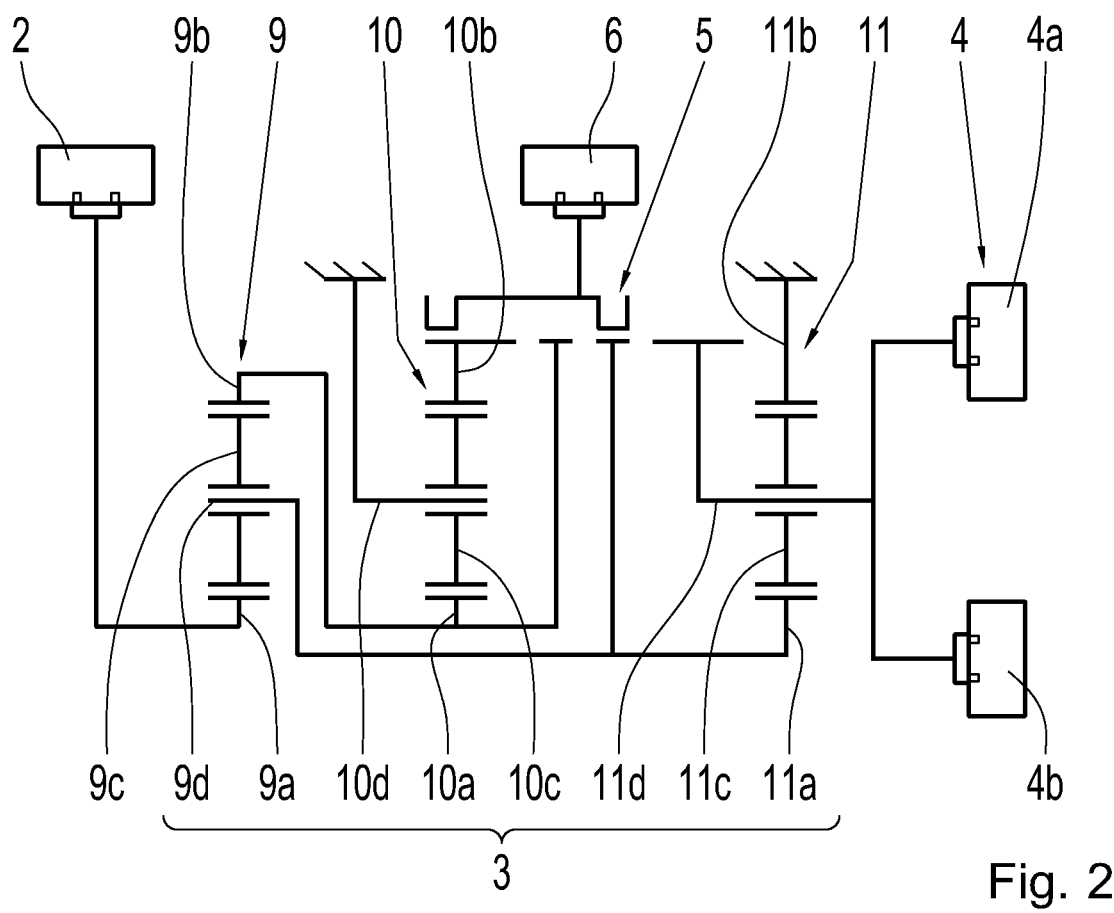
FIG. 2: A more detailed example of a drivetrain scheme of a vehicle in the form of an electric vehicle.

FIG. 2 visualizes an example embodiment of the transmission 3 of a motor vehicle in the form of an electric vehicle, which is connected between the electric machine 2 that serves as the drive unit and the drive output 4. Of the drive output 4, two driven wheels 4a, 4b of a driven axle of the drive output 4 are shown.

The transmission 3 of FIG. 2 comprises three planetary gearsets 9, 10, and 11. Of the planetary gearsets 9, 10, and 11, respective sun gears 9a, 10a, 11a, ring gears 9b, 10b, 11b, planetary gearwheels 9c, 10c, 11c and webs 9d, 10d, 11d are shown. In FIG. 2 the electric machine 2, serving as the drive unit, engages with the ring gear 9b of the planetary gearset 9. The drive output 4 is coupled to the web 11d of the planetary gearset 11.

The transmission 3 can be shifted so as to provide various gears and thus various gear ratios. The interlocking shifting element 5 serves for the shifting.

In the shifting position shown in FIG. 2, the interlocking shifting element 5 of the transmission 3 couples the ring gear 10b of the planetary gearset 10 to the sun gear 11a of the planetary gearset 11.

In a shifting position different from the above, the interlocking shifting element 5 of the transmission 3 couples the sun gear 10a of the planetary gearset 10 to the web 11d of the planetary gearset 11.

In the interlocking shifting element 5, a so-termed tooth-on-tooth position can occur, the result of which is that the interlocking shifting element 5 cannot be properly closed. The invention now relates to such details as will serve to resolve, and in an advantageous further development also to recognize a tooth-on-tooth position in the interlocking shifting element 5.

When a tooth-on-tooth position occurs in the interlocking shifting element 5, then as a function of an electric current strength in the electric actuator 6 of the interlocking shifting element 5, a target torque is determined, which is required at the transmission input of the transmission 3 in order to resolve the tooth-on-tooth position in the interlocking shifting element 5, i.e., which, in order to resolve the tooth-on-tooth position, should be provided at the transmission input of the transmission 3 by the electric machine 2.

The electric machine 2 of the motor vehicle is then activated to provide the said target torque, in order to deliver the previously determined target torque at the transmission input of the transmission 3 and so to resolve the tooth-on-tooth position in the interlocking shifting element 5.

Preferably the target torque required for resolving the tooth-on-tooth position in the interlocking shifting element 5 is determined by computation, as follows:

$$M_{SOLL} = \frac{K_M * I_A}{r_S} * \mu_Z * r_Z + M_0$$

in which $M_{SOLL}$ is the target torque, $I_A$ is the electric current strength of the electric actuator, $K_M$ is a proportionality constant, $r_S$ is a radius of a spindle of the electric actuator, $\mu_Z$ is a coefficient of friction valid for the transmission, $r_Z$ is a friction radius of the transmission valid for the interlocking shifting element, and $M_0$ is a torque to be transmitted by the interlocking shifting element.

The frictional coefficient $\mu_Z$ of the transmission 3 valid for the interlocking shifting element 5, the friction radius $r_Z$ of the transmission valid for the interlocking shifting element, the radius $r_S$ of the spindle of the electric actuator 6 and the proportionality constant $K_M$ are in each case constant parameters predetermined by the control system. The torque $M_0$ to be transmitted by the interlocking shifting element is known by the control system.

$$\frac{K_M * I_A}{r_S}$$

in the above equation corresponds to the contact pressure exerted by the electric actuator 6 on a sliding sleeve of the interlocking shifting element 5 as a result of the electric current strength in the electric actuator.

Accordingly, if an interlocking shifting element 5 is acted upon by a torque $M_0$ applied by the electric actuator 6 to the interlocking shifting element 5, and if thereby a tooth-on-tooth position is formed in the latter, then as a function of the electric current strength in the electric actuator a torque offset can be determined, which the electric machine 2 must provide at the input to the transmission 3 in addition to the torque $M_0$ in any case applied to the interlocking shifting element 5. Depending on whether the transmission 3, which comprises the interlocking shifting element 5, is being operated in the traction mode or in the overdrive mode of the vehicle, this torque offset that depends on the electric current strength in the electric actuator 6 can be positive or negative.

Preferably, as a function of the electric current strength in the actuator 6, it is possible to determine not only the target torque required at the transmission input for resolving a tooth-on-tooth position, but rather, as a function of the electric current strength in the actuator 6, it is also determined whether there is a tooth-on-tooth position in the interlocking shifting element 5.

This can be done in that when the electric actuator 6 begins activating a shifting element 5, a timer is started and the time that has passed since the activation of the interlocking shifting element 5 by the electric actuator 6 begins is determined. In addition, the electric current strength through the electric actuator 6 is determined. If it is recognized that the electric current strength through the electric actuator 6 is or will be larger than a limit value predetermined by the control system before the lapse of a defined time interval predetermined by the control system since the beginning of the activation of the interlocking shifting element 5 by the electric actuator 6, then it is concluded that a tooth-on-tooth position in the interlocking shifting element 5 has occurred.

So, depending on the electric current strength in the electric actuator 6, on the one hand, it can be concluded that there is a tooth-on-tooth position in the interlocking shifting element 5 and, in addition, as a function of the electric current strength, that target torque can be reliably determined which must be applied at the transmission input in order to resolve the tooth-on-tooth position in the interlocking shifting element 5.

The invention further relates to a control unit designed to carry out the method according to the invention automatically by control means. The control unit is, in particular, the transmission control unit 7. The control unit is an electronic control unit comprising hardware means and software means for implementing the method according to the invention.

The hardware means include data interfaces for exchanging data with the assemblies involved in carrying out the method according to the invention, such as the electric actuator 6 and the motor control unit 8. In addition, the hardware means include a processor for data processing and a memory for data storage. The software means include program modules implemented in the control unit for carrying out the method according to the invention.

As already mentioned, the control unit according to the invention is designed to carry out the method according to the invention. Thus, the control unit is designed, if a tooth-on-tooth position is recognized at the interlocking shifting element 5, to determine as a function of the electric current strength in the electric actuator 6 the target torque that must be applied at the transmission input of the transmission 3 in order to resolve the tooth-on-tooth position. Furthermore, the control unit is designed, depending on the said target torque, to control the electric machine 2 either directly or indirectly by way of the control unit 8.

Moreover, the invention relates to a transmission 3 of a vehicle comprising such a control unit, and to a vehicle having such a transmission 3, the said vehicle being in particular an electric vehicle.

INDEXES

1 Drivetrain
2 Electric machine
3 Transmission
4 Drive output
4a Wheel
4b Wheel
5 Interlocking shifting element
5a Shifting element half
5b Shifting element half
6 Electric actuator
7 Transmission control unit
8 Motor control unit
9 Planetary gearset
9a Sun gear
9b Ring gear
9c Planetary gearwheel
9d Web
10 Planetary gearset
10a Sun gear
10b Ring gear
10c Planetary gearwheel
10d Web
11 Planetary gearset
11a Sun gear
11b Ring gear
11c Planetary gearwheel
11d Web

The invention claimed is:

1. A method for operating an interlocking shifting element of a transmission of a vehicle, wherein the interlocking shifting element comprises shifting element halves configured to be moved relative to one another when opening and closing the interlocking shifting element, and wherein an electric actuator is configured and arranged to bring about the relative movement between the shifting element halves when opening or closing the interlocking shifting element, the method comprising:
  recognizing a tooth-on-tooth position in the interlocking shifting element; and
  determining, as a function of an electric current strength through the electric actuator, a target torque to be applied at a transmission input of the transmission sufficient to resolve the tooth-on-tooth position in the interlocking shifting element;
  wherein determining the target torque is performed according to the following equation:

$$M_{SOLL} = \frac{K_M * I_A}{r_S} * \mu_Z * r_Z + M_0$$

and wherein
$M_{SOLL}$ is the target torque,
$I_A$ is the electric current strength of the electric actuator,
$K_M$ is a proportionality constant,
$r_S$ is a radius of a spindle of the electric actuator,
$\mu_Z$ is a coefficient of friction valid for the transmission,
$r_Z$ is a friction radius of the transmission valid for the interlocking shifting element, $M_O$ is a torque to be transmitted by the interlocking shifting element.

2. The method according to claim 1, wherein the vehicle comprises a drive unit, the method further comprising:
controlling the drive unit to deliver the target torque at the transmission input to resolve the tooth-on-tooth position in the interlocking shifting element.

3. The method according to claim 2, wherein the drive unit comprises an electric machine.

4. The method according to claim 1, wherein recognizing the tooth-on-tooth position is performed as a function of the electric current strength through the electric actuator.

5. The method according to claim 4, wherein recognizing the tooth-on-tooth position comprises:
activating, by the electric actuator, the interlocking shifting element;
recognizing, before a lapse of a pre-defined time interval since a beginning of activating the interlocking shifting element by the electric actuator, that the electric current strength in the electric actuator is greater than a limit value; and
determining a shifting position of the interlocking shifting element to be the tooth-on-tooth position of the interlocking shifting element based at least in part on the electric current strength being greater than the limit value.

6. A control unit of a vehicle transmission, wherein the control unit is configured to
(i) bring about opening and/or closing of an interlocking shifting element by activating an electric actuator to produce a relative movement between shifting element halves of the interlocking shifting element;
(ii) recognize a tooth-on-tooth position in the interlocking shifting element; and
(iii) determine, as a function of an electric current strength in the electric actuator, a target torque to be provided at a transmission input of the transmission sufficient to resolve the tooth-on-tooth position in the interlocking shifting element;
wherein the control unit is configured to automatically carry out the method of claim 1.

7. A transmission of a vehicle, comprising the control unit of claim 6.

8. A vehicle comprising the control unit of claim 6.

9. The vehicle of claim 8, wherein the vehicle is an electric vehicle.

* * * * *